July 26, 1955     G. E. LINGLE     2,713,819
JUICE EXTRACTOR

Filed Sept. 23, 1954     6 Sheets-Sheet 1

INVENTOR.
Garland E. Lingle
BY Victor J. Evans & Co.
ATTORNEYS

July 26, 1955

G. E. LINGLE 2,713,819

JUICE EXTRACTOR

Filed Sept. 23, 1954

INVENTOR.
Garland E. Lingle
BY Victor J. Evans & Co.
ATTORNEYS

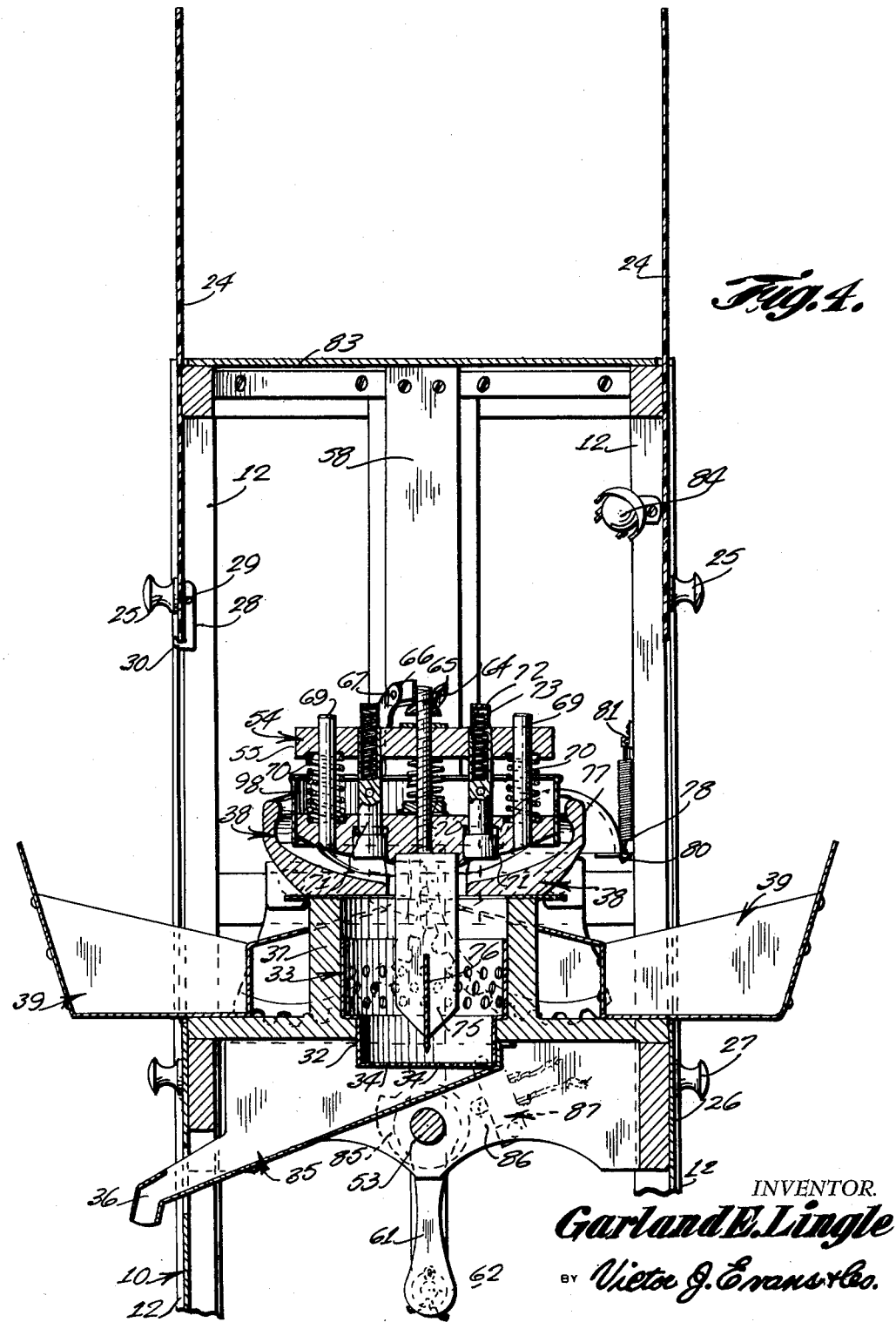

July 26, 1955

G. E. LINGLE 2,713,819

JUICE EXTRACTOR

Filed Sept. 23, 1954

INVENTOR.
Garland E. Lingle
BY Victor J. Evans & Co.
ATTORNEYS

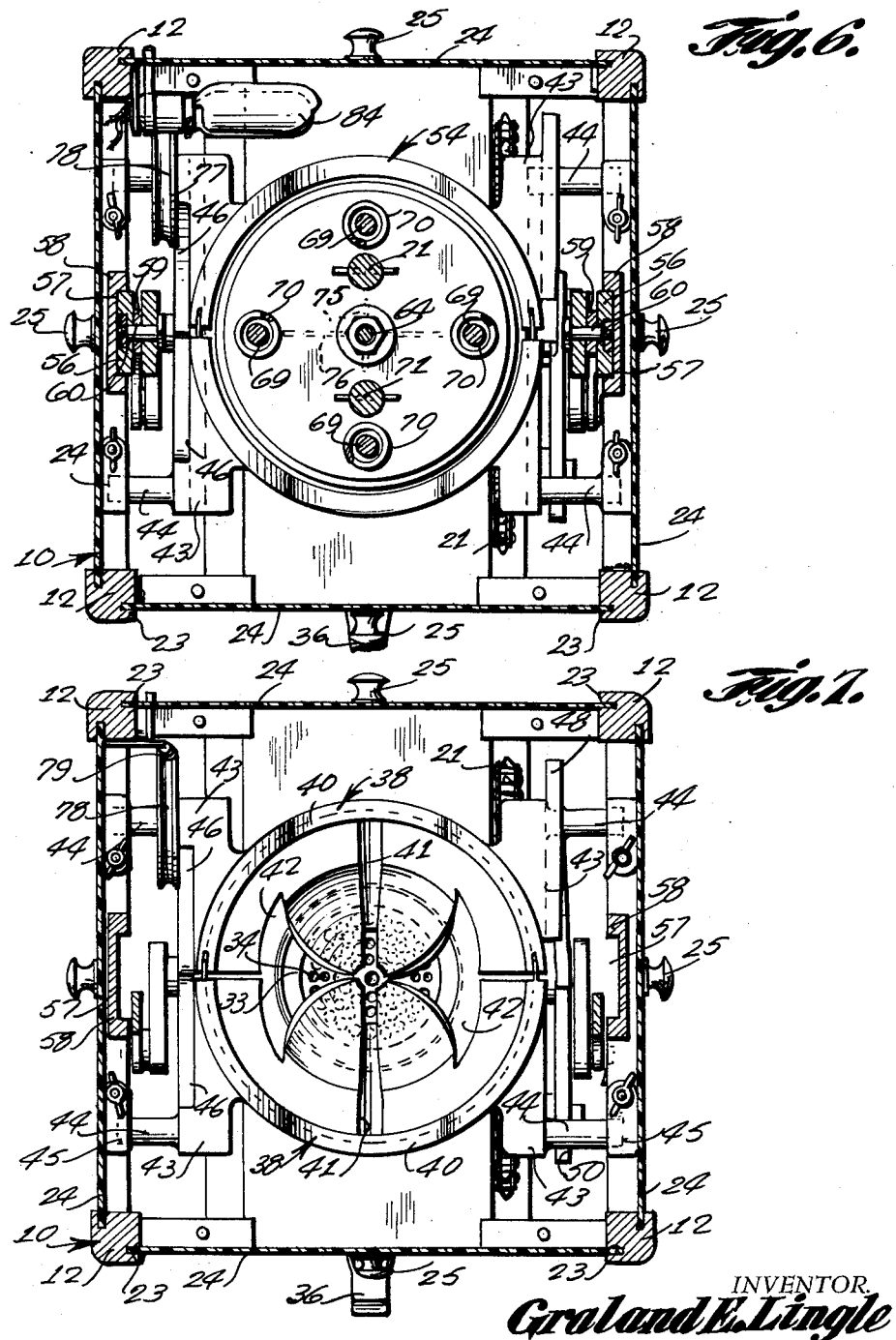

July 26, 1955 G. E. LINGLE 2,713,819
JUICE EXTRACTOR
Filed Sept. 23, 1954 6 Sheets-Sheet 6
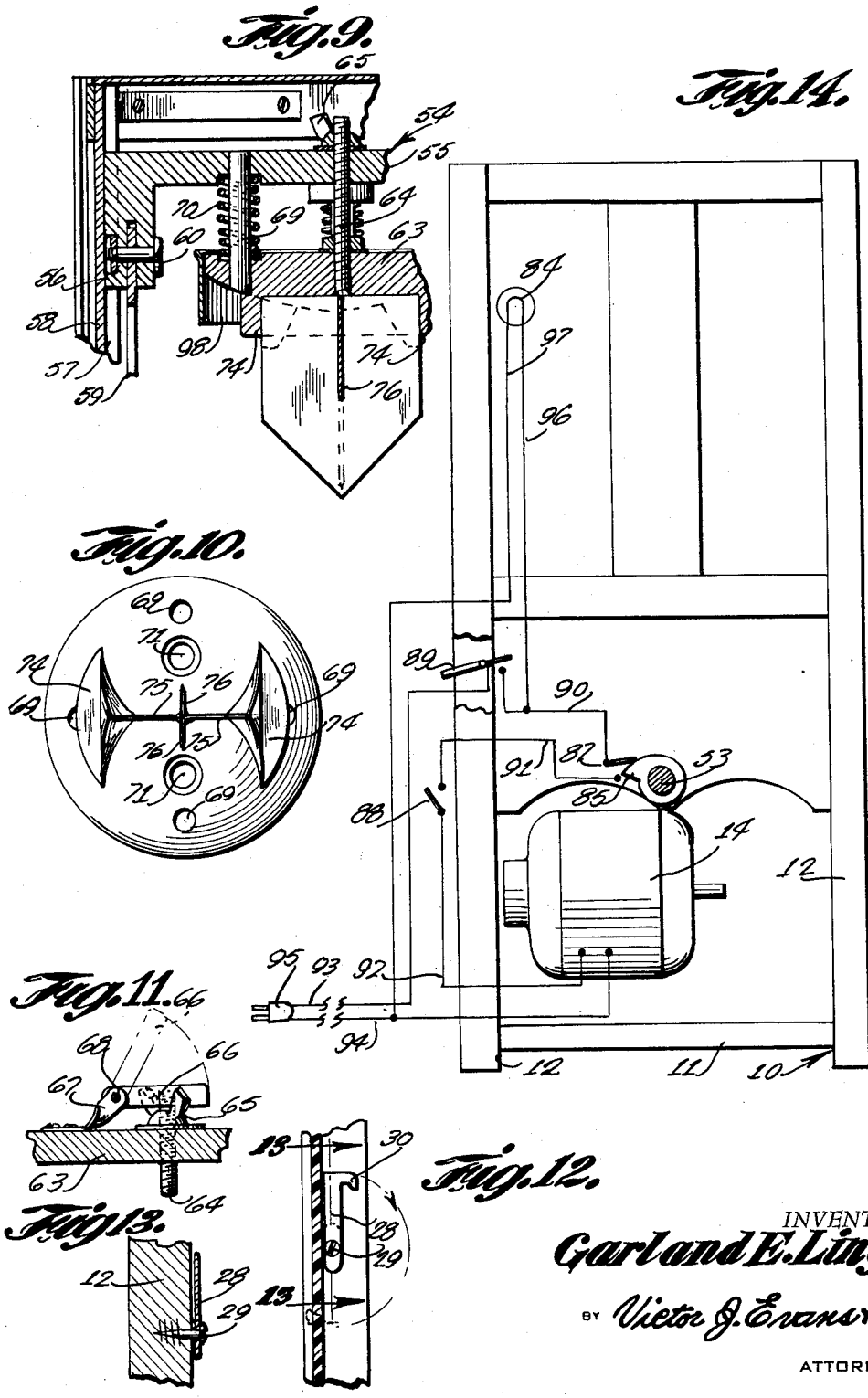
INVENTOR.
Garland E. Lingle
BY Victor J. Evans & Co.
ATTORNEYS United States Patent Office 2,713,819
Patented July 26, 1955

2,713,819

JUICE EXTRACTOR

Garland E. Lingle, Durham, N. C.

Application September 23, 1954, Serial No. 457,841

1 Claim. (Cl. 100—98)

This invention relates to a juice extracting machine, and more particularly to a machine for squeezing or extracting juice from fruits and the like such as oranges.

The object of the invention is to provide a machine which will automatically crush and squeeze citrus fruits such as oranges, grapefruits and the like, and then eject the residual portion of the oranges from the machine so that additional oranges can be inserted in the machine to be squeezed or de-juiced.

Another object of the invention is to provide an orange juice machine wherein there is provided a vertically shiftable head that carries cutting and crushing blades which move into and out of engagement with an orange or the like so that the juice will be squeezed from the orange and wherein this juice will pass through a filter into a trough so that the pure fruit juice can be collected in any suitable receptacle, there being a pair of automatically operated jaws for ejecting the pulp which remains after the juice has been extracted.

A further object of the invention is to provide a juice extracting machine which is compact and ruggedly constructed and which automatically cuts off after each cycle of operation, so that there is no possibility of the operator or user accidentally hurting himself or herself while inserting oranges or other fruit to be squeezed in the machine.

A still further object of the invention is to provide a juice extracting machine which includes a housing or frame that has a base therein, there being a motor supported on the base and adapted to be connected to a suitable source of electrical energy, the machine further including a partition arranged above the base and having a filter supported thereon, there being a pair of ejecting jaws actuated by the motor and a crushing head mounted for movement toward and away from the jaws, the crushing head also being actuated by the motor.

Other objects and advantages will be apparent during the course of the following description.

In the accompanying drawings, forming a part of this application, and in which like numerals are used to designate like parts throughout the same:

Figure 4 is a sectional view taken on the line 4—4 of Figure 3.

Figure 6 is a sectional view taken on the line 6—6 of Figure 1.

Figure 7 is a sectional view taken on the line 7—7 of Figure 1.

Figure 9 is a fragmentary sectional view showing a portion of the crushing head.

Figure 10 is a bottom plan view of the crushing head.

Figure 11 is a sectional view showing the stop member on top of the crushing head.

Figure 12 is a fragmentary sectional view taken through one of the windows and showing the latch therefor.

Figure 13 is a sectional view taken on the line 13—13 of Figure 12.

Figure 14 is a schematic showing of the wiring diagram for the juice extractor.

Figure 1:
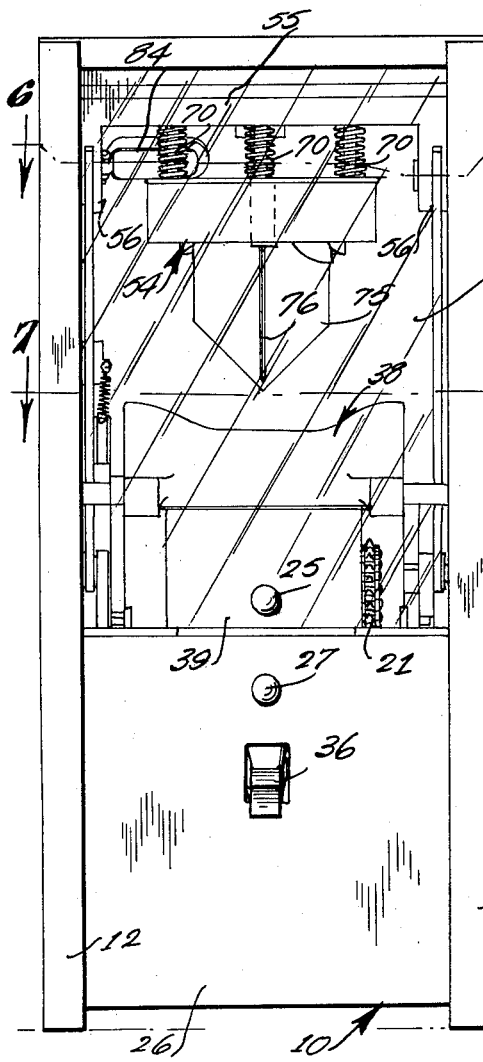
Figure 1 is a front elevational view of the juice extractor, constructed according to the present invention.

Referring in detail to the drawings, the numeral 10 designates a housing or frame which may be made of any suitable material, and the housing 10 includes a horizontally disposed base 11 that is arranged adjacent the lower end of the housing. There is further provided a plurality of vertically disposed spaced parallel posts 12 which may be secured to the base 11 in any suitable manner, and supported on the base 11 and secured thereto is an electric motor 14. The motor 14 is adapted to be connected to a suitable source of electrical energy, and operated by the motor 14 is a gear box 15 which is also mounted on the base 11. The gear box 15 serves to drive a shaft 16 which has a sprocket 17 mounted thereon, and there is further provided an idler sprocket 18 which is mounted on an adjustable support 19, and by loosening the bolt and nut assembly 20, the support 19 can be moved as desired. An endless chain 21 is trained over the pair of sprockets 17 and 18 and the chain 21 is also trained over a large sprocket wheel 22, Figure 2, for a purpose to be later described.

The opposed surfaces of the posts 12 are provided with slots or grooves 23, Figures 6 and 7, and these grooves 23 define trackways for slidably receiving therein upper transparent members or windows 24. Knobs 25 are secured to the slidable windows 24 so that these members can be raised when the machine is to be operated in order to prevent the windows from becoming broken by the moving parts. The trackways 23 also receive sliding doors 26 which have knobs 27 secured thereto, Figure 5, and these doors can be raised when access is to be gained to the parts within the housing. A means is provided for maintaining these doors and windows immobile in their raised or adjusted position, and this means comprises latches 28 which are pivotally connected to the posts 12 by screws or pins 29, Figures 12 and 13. Each of the latches 28 is provided with a hook 30 which is adapted to be swung beneath the lower edge of the window or sliding door so as to retain these members in their raised position when desired, as for example as shown in Figure 5.

Figure 5:
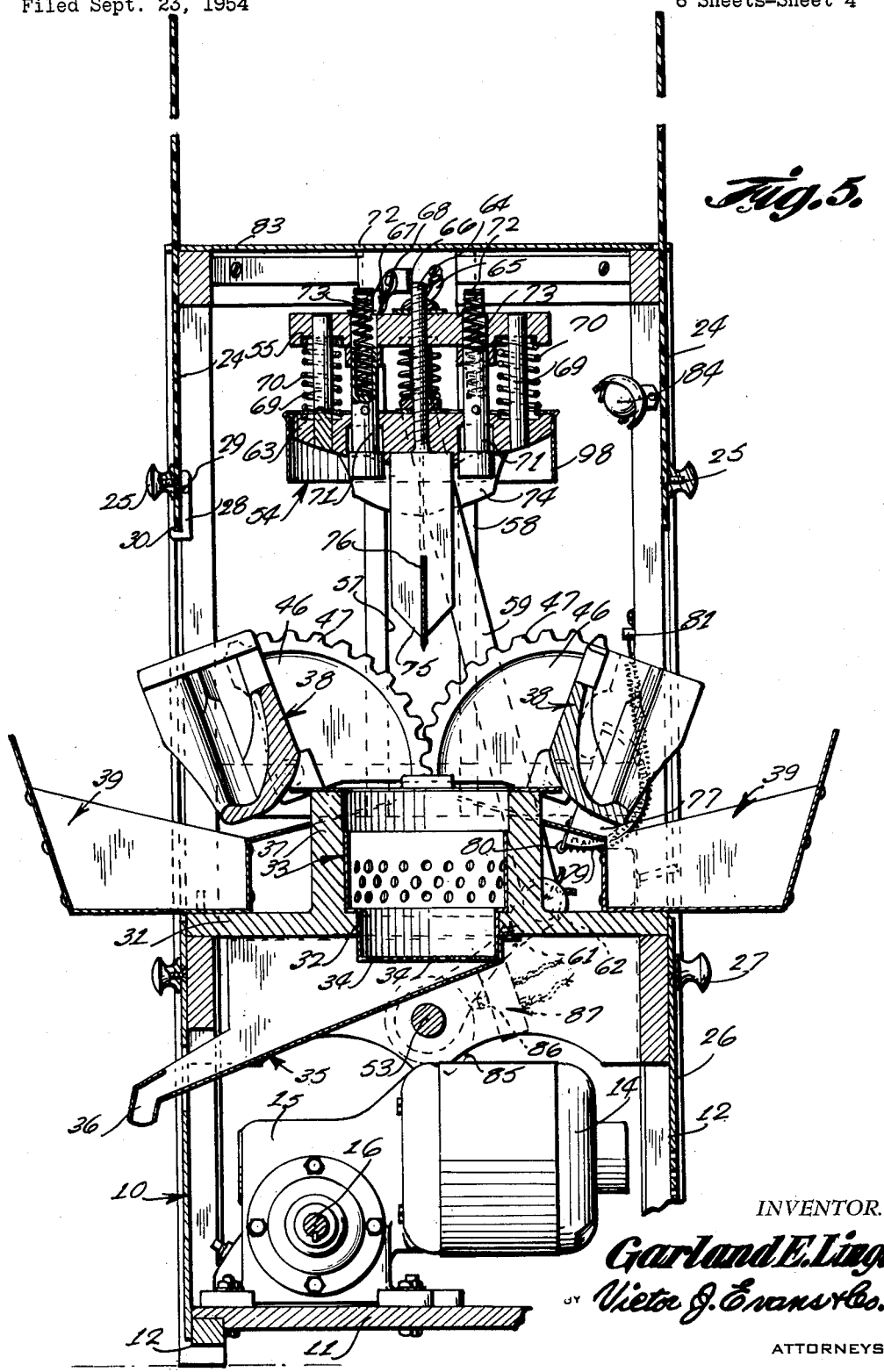
Figure 5 is a vertical longitudinal sectional view taken through the machine and showing the head in raised position.

Arranged in spaced parallel relation above the base 11 is a partition or platform 31, Figure 5. The platform 31 is provided with a central opening 32, and a filter or strainer 33 has its lower end extending through the opening 32. The filter is provided with a plurality of apertures or openings 34 whereby juice such as juice that has been squeezed from oranges and the like can pass through these apertures 34 and onto the inclined bottom wall of a trough 35. The trough 35 includes a discharge spout 36 whereby the filtered orange juice can be collected in any desired container or receptacle.

Extending upwardly from the platform 31 and secured thereto or formed integral therewith is an annular support member 37 which surrounds the upper portion of the filter 33. A pair of ejector jaws or bowl segments 38 are pivotally mounted in the housing, and these bowl segments are mounted for movement toward and away from each other, as later described in this application. The bowl segments 38 serve to automatically eject the pulp or residual portion of the orange after the juice has been removed therefrom, and the residual portions of oranges are automatically dispensed or ejected into trays 39. The trays 39 are mounted in the housing in such a manner that they can be readily removed when they are to be emptied or cleaned. Each of the bowl segments 38 includes a curved lip portion 40 and there is provided in the bowl segments channels 41 whereby the juice that has been squeezed from the oranges can run toward the opening in the center of the bowl segments and into the filter 33, Figure 7. The bowl segments 38 are further provided with openings 42 through which the juice can pass, and arms 43 extend from the bowl segments 38 and are secured thereto or formed integral therewith. Stub shafts 44 extend from the arms 43 and the stub shafts 44 engage bearing blocks 45 so that the stub shafts 44 provide a pivotal mounting for the pair of bowl segments 38. Thus, the bowl segments 38 can assume the position shown in Figure 5 whereby the orange pulp or residue thereon will be automatically ejected into the trays 39. When the oranges or other fruit is being squeezed, the bowl segments 38 are in the position shown in Figure 4.

A means is provided for causing this pivotal movement of the pair of bowl segments 38, and this means comprises sector plates 46 which are in the shape of a quadrant, and the sector plates 46 include intermeshing or interengaging teeth 47. Depending from one of the bowl segments and secured thereto or formed integral therewith is a cam 48 which has a lower arcuate surface 49, Figure 2, and a lug 50 is mounted for movement into and out of engagement with the lower curved surface 49 of the cam 48. The lug 50 is mounted on a crankshaft 53 by means of a clamp 51 which may be in the nature of a pair of fingers that are interconnected together by a bolt and nut assembly 52. Thus, as the shaft 53 rotates, the lug 50 will rotate therewith so that for each revolution of the shaft 53 the lug 50 will engage the cam 49 and pivot it or raise it whereby one of the sector plates 46 will be rotated or pivoted. However, since the teeth 47 of the sector plates 46 are in mesh, pivotal movement of one sector plate 46 will result in pivotal movement of the other sector plate so that both bowl segments 38 will move at the same time. The shaft 53 has the large sprocket wheel 22 mounted thereon or secured thereto so that it will be seen that actuation of the motor 14 causes the sprocket 22 to rotate and this in turn causes rotation of the shaft 53 and operation of the ejector bowl segments 38.

The juice extractor of the present invention further includes a crushing head 54 which is mounted for vertical reciprocation in the housing. The crushing head 54 includes an upper cap 55 that has a pair of downwardly extending fingers 56 secured thereto or formed integral therewith, Figure 9. The fingers 56 are slidably mounted in trackways or slots 57 which are formed in rails or bars 58. There is a pair of the bars 58 provided, and these bars are secured to suitable portions of the housing.

A means is provided for causing reciprocation of the head 54 so that oranges can be crushed thereby. This means comprises a pair of levers 59 which have their upper ends pivotally connected to the fingers 56 by bolt and nut assemblies 60. A pair of links 61 each have one end secured to the shaft 53, and the other ends of the links 61 are pivotally connected to the lower ends of the levers 59 by means of pivot pins 62, Figure 2. Thus, as the shaft 53 is rotated by means of the previously described chain and sprocket mechanism, the links 61 will rotate and this in turn will cause movement of the levers 59 and reciprocation of the head 54.

The head 54 further includes a body member 63 which is mounted below the cap 55 and the body member 63 can move towards and away from the cap 55. A threaded bolt 64 extends upwardly from the body member 63 through the cap 55, and a wing nut 65 is arranged in threaded engagement with the top of the bolt 64, Figure 11. An ear 66 is arranged in engagement with the wing nut 65 for preventing accidental rotation of the wing nut, and the ear 66 is pivotally connected to a bracket 67 by means of a pin 68. The bracket 67 is secured to the upper surface of the cap 55 and the ear 66 can be swung from the solid line position of Figure 11 to the dotted line position of Figure 11 when the wing nut is to be manually adjusted. Guide pins 69 extend between the cap 55 and body member 63, and coil springs 70 are circumposed on each of the pins 69, the coil springs 70 serving to normally urge the body member 73 away from the cap 55. Ejector pins 71 slidably engage the body member 63, and the ejector pins 71 have coil springs 73 arranged in engagement therewith, there being stop members 72 for retaining the coil springs 73 in their proper position. Thus, in the event that any of the residual portions of the orange adhere to the bottom of the head 54 when the head starts to move up, then the coil springs 73 will move the pins 71 downwardly slightly with respect to the body member 63 so that such material will be automatically ejected or disengaged from the head so that there will be no particles clinging thereto.

Secured to the undersurface of the body member 63 of the head 54 are fruit crushing members 74 which coact with right angularly arranged blades 75 and 76, Figure 10. These elements 74, 75 and 76 move downwardly as the head is moved down to engage the fruit that is being held on the bowl segments when the bowl segments are in the position shown in Figure 4. Thus, the blades 75 and 76 will effectively sever the oranges or other fruit, while the element 74 will crush the fruit so that all of the juice will be squeezed therefrom whereby this juice will run down through the filter into the trough 35.

Figure 2:
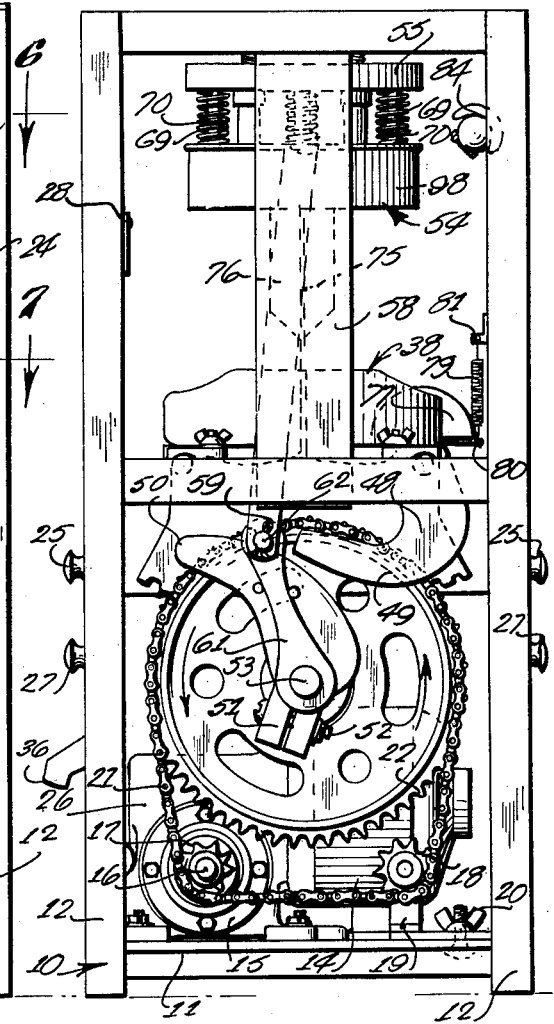
Figure 2 is a side elevational view of the juice extractor.

A means is provided for automatically returning the bowl segments 38 from the position shown in Figure 5 to the position shown in Figure 4 after the pulp or other remaining material has been ejected from the jaws into the trays 39. This means comprises a bracket 77 which is secured to one of the bowl segments or formed integral therewith, and the bracket 77 includes a curved groove 78 which provides a trackway for receiving a portion of a return spring 79. A securing element 80 serves to connect one end of the coil spring 79 to the bracket 77, while the other end of the coil spring 79 is secured to the housing by means of a securing element 81. Thus, when the parts move to the position shown in Figure 5, the spring 78 is stretched so that as soon as the lug 50 passes beyond the cam 48 as shown in Figure 2, the coil spring 79 will bias or urge the parts back from the position shown in Figure 5 to the position shown in Figure 2.

Figures 3, 8:
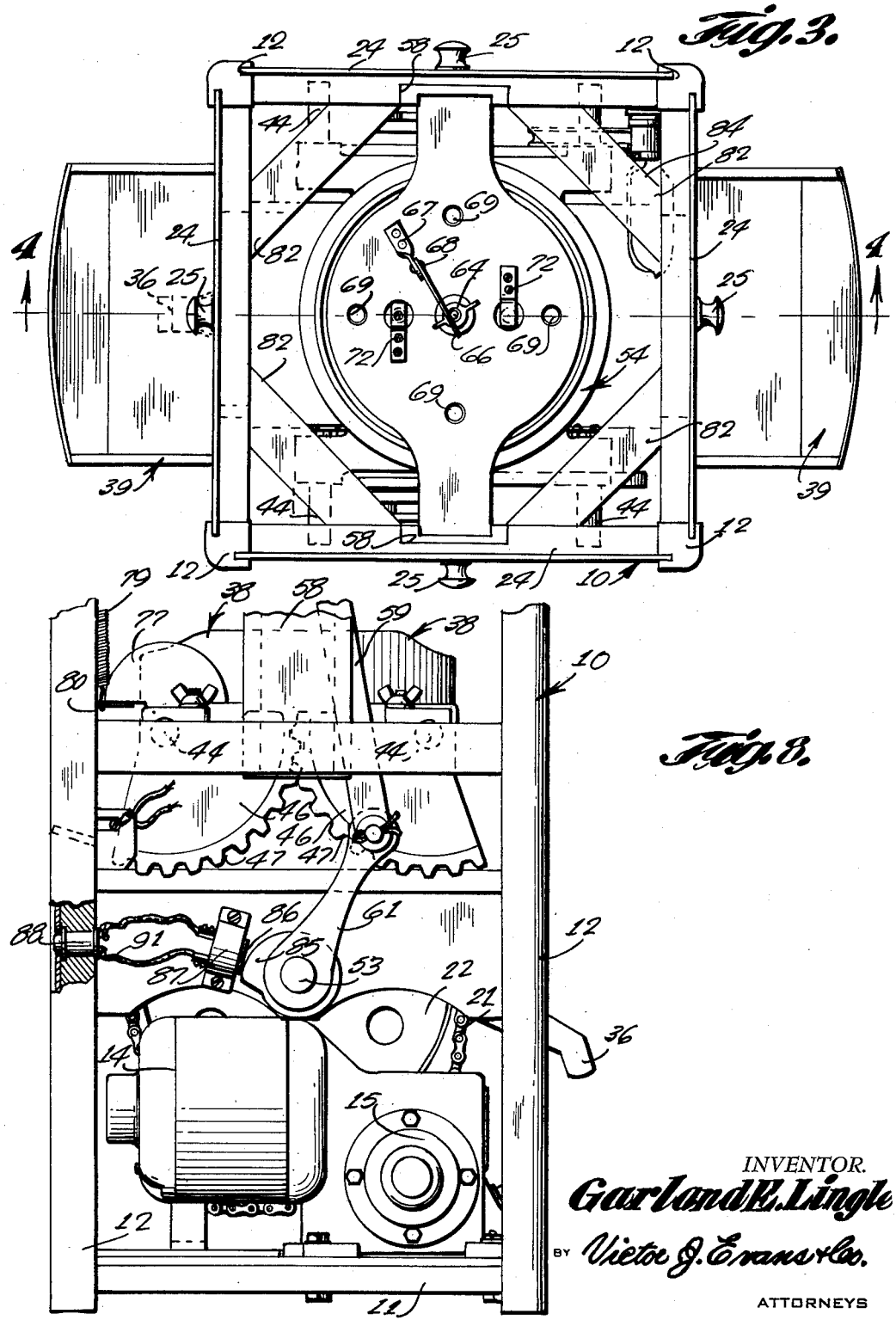
Figure 3 is a top plan view of the machine, with the cover removed.
Figure 8 is a fragmentary elevational view showing the motor actuating means.

Braces 82 may be provided for reinforcing the housing, Figure 3, and a light bulb 84 is electrically connected in the circuit as shown in Figure 14 whereby the housing is properly illuminated. A cover or lid 83 may be detachably mounted on top of the housing, and the lid 83 can be removed when desired.

Mounted on the shaft 53 is a cam 85, Figure 8, and the cam 85 is mounted for movement into and out of engagement with a button 86 of a conventional cut-off switch 87. The switch 87 is electrically connected to a push button switch 88, and the switch 88 is of the manual reset type. The electrical circuit is such that for each revolution of the shaft 53, the high point of the cam 85 will engage the button 86 to cause the switch 87 to break the circuit leading to the motor 14 so that operation of the machine will stop. Then, the user can safely insert his hands in the machine and place additional oranges to be squeezed on the bowl segments 38 when the bowl segments 38 are in their closed position and then the push button switch 88 is manually actuated to again complete the circuit to the motor 14 so that the various parts including the head 54 and bowl segments will be actuated whereby the oranges will be squeezed. Thus, after each cycle of squeezing the oranges and ejecting the pulp or skins, the motion of the parts will stop so that additional fruit to be squeezed can be manually inserted in the machine without any possibility of injury to the person's hands. A safety switch 89 is provided, and the safety switch 89 can only be reached by raising the windows 24. Thus, if the windows 24 were not raised, they would immediately shatter or break since the bowl segments 38 move beyond the space that the windows normally occupy as the jaws pivot. Thus, in order to get to the safety switch 89 it is necessary to raise the windows. These windows are retained in their upward position by means of the previously described latches 28.

Referring to Figure 14 of the drawings there is shown a schematic wiring diagram wherein wires 90 and 91 lead from the cut-off switch 87, and a wire 92 leads from the motor 14 to the reset switch 88. Supply lines 93 and 94 are connected to a plug 95 which is adapted to be connected to a suitable source of electrical energy, and wires 96 and 97 connect the bulb 84 in the circuit. A shield 98 of cylindrical shape surrounds the lower portion 63 of the head 54, and the shield 98 serves to help prevent the juice from splattering as the orange is being crushed whereby the juice will all flow downwardly into the receiving trough.

From the foregoing it is apparent that there has been provided a machine which will effectively squeeze juice from various foodstuff such as oranges or other citrus fruits and in use with the parts arranged as shown in the drawings, the windows 24 are first initially raised to the position shown in Figure 4 and maintained in this raised position by means of the latches 28. Then, with the head 54 in its raised position as shown in Figure 1, one or more oranges are manually deposited in the cradle formed by the closed bowl segments 38 as shown in Figures 1 and 2 and then the cycle of operation is started by manually pressing the switches 89 and 88. The switch 89 serves as a safety switch and can only be actuated when the windows are raised so as to prevent the windows from being broken by the swinging jaws. Then, when the switch 88 is depressed, the switch 87 is automatically reset after the high point of the cam 85 has moved past the switch 87. This causes actuation of the motor 14 which in turn drives the shaft 53 through the previously described chain and sprocket mechanism. The shaft 53 will turn one complete revolution or 360 degrees and then stop since the cam 85 mounted on the shaft 53 will open the switch 87 as shown in Figure 14 for each revolution of the shaft 53 whereby the circuit will be broken until it is reset by manually pressing in on the switch 88. The advantage of having the circuit broken each time is that up and down movement of the head 54 is stopped and also swinging movement of the bowl segments is stopped after each crushing and ejecting operation so that additional oranges to be squeezed can be placed in the machine without danger of injuries to the user's hands.

As the shaft 53 rotates, it carries the lug 50 around therewith and this lug 50 swings around in a counterclockwise direction to engage the under curved surface 49 of the cam 48 and this in turn causes pivotal movement of one of the bowl segments 38 since the cam 48 is secured to one of the bowl segments 38. As this one segment pivots, the other segment pivots in the opposite direction due to the intermeshing teeth 47. As soon as the lug 50 clears the cam 48, as for example as shown in Figure 2, the return spring 79 will cause the segments 38 to return or pivot back to their initial position. The purpose of having the jaws swing open from the position shown in Figures 1 and 2 to the position shown in Figure 5 is to cause the pulp or skin remaining after the juice has been squeezed, to be thrown or ejected into the trays 39 automatically. When the trays 39 are to be emptied or cleaned they can be readily removed from the machine. The head 54 is vertically shiftable by means of the links 61 which are secured to the shaft 53 and rotate therewith, and the links 61 are pivotally connected to the levers 59, the upper ends of the levers 59 being pivotally connected to the fingers 56 of the head. Thus, the head will move up and down and this movement is timed so that when the head moves down the jaws 38 are in their closed position as shown in Figure 4 and since the oranges are supported by the jaws 38, the downward movement of the head 54 will cause the cutting elements 75 and 76 to initially pierce the orange or oranges, and then the element 74 will further crush the oranges so that all of the juice will be effectively squeezed from the oranges whereby this juice will run down through the openings 42 into the filter 33. The filter 33 has the apertures 34 which only permit the juice to flow therethrough so that seeds and the like will be retained in the filter and this juice will then pass down into the trough 35 and out the discharge spout 36 where it can be collected in any suitable manner. As soon as the orange has been crushed, the head 54 moves upwardly again to the position shown in Figure 5 and immediately thereafter the bowl segments 38 swing open to automatically eject the peels and the like. As the head 54 moves up, the ejecting pins 71 move downwardly slightly due to the coil springs 73 to thereby automatically eject any peels or skins that may be adhering to the undersurface of the head. When the head 54 is in its raised position and the bowl segments 38 are closed, the motor 14 stops since the cam 85 opens the switch 87 and then additional oranges are placed in the cradle formed by the closed bowl segments 38 and then the switch 88 is manually depressed so as to repeat the previously described cycle of operations whereby juice is squeezed therefrom. The light 84 remains on all the time, but both switches 88 and 89 must be closed before the motor 14 will be energized. The springs 70 insure that the head will have a certain amount of resiliency to provide gradual squeezing for the fruit so that as soon as the bottom portion of the head engages the jaws or fruit, it starts its squeezing action and then this squeezing action is of a gradual nature due to the provision of the yieldable springs 70.

I claim:

In a juice extractor, a housing embodying a horizontally disposed base, a plurality of vertically disposed spaced parallel posts secured to said base and extending upwardly therefrom, a motor mounted on said base and adapted to be connected to a source of electrical energy, driving means operated by said motor, a crankshaft supported above said base and operated by said driving means, a horizontally disposed platform positioned above said base and provided with a central opening, a perforated strainer extending through said opening and supported by said platform, a cylindrical support portion extending upwardly from said platform and surrounding the upper portion of said strainer, a pair of pivotally mounted bowl segments positioned above said platform and mounted for movement towards and away from each other into closed and opened position, said bowl segments in their closed position forming a receptacle for holding fruit, said bowl segments being openable to permit ejection of the crushed fruit, there being openings in said bowl segments for the passage therethrough of expressed material into said strainer, said bowl segments having channels for guiding the juice to said openings, sector plates secured to said bowl segments and provided with intermeshing gear teeth, a cam depending from one of said sector plates, a curved lug secured to said crankshaft for movement into and out of engagement with said cam, a bracket secured to one of said sector plates, a coil spring arranged in engagement with said bracket for urging said bowl segments towards each other to closed position, a head vertically shiftable in said housing and the lower portion of said head entering said bowl segments when the head is in lowered position, said head including a cap provided with a pair of spaced parallel fingers, a pair of spaced parallel rails secured in said housing and including grooves defining tracks for slidably receiving said fingers, a body member positioned below said cap, a shield surrounding said body member for preventing splattering of juice, spring pressed ejector pins extending through said cap and body member, levers having their upper ends pivotally connected to said fingers, links secured to said crankshaft and pivotally connected to the lower ends of said levers, and cutting and crushing elements depending from said lower portion of said head and adapted to extend into said openings in said bowl segments whereby the fruit is severed and crushed upon lowering of said head into said bowl segments in a manner to permit juice to be extracted therefrom without splattering and to permit flow of the juice through said openings into said strainer.

References Cited in the file of this patent

UNITED STATES PATENTS

| | | |
|---|---|---|
| 759,399 | Sheppard | May 10, 1904 |
| 2,345,843 | Watkins | Apr. 4, 1944 |
| 2,363,798 | McCulloch | Nov. 28, 1944 |
| 2,369,305 | Lobasso | Feb. 13, 1945 |
| 2,552,171 | Hagerty | May 8, 1951 |
| 2,667,118 | Nelson | Jan. 26, 1954 |